United States Patent [19]

Szuszczewicz et al.

[11] 4,006,404

[45] Feb. 1, 1977

[54] PULSED PLASMA PROBE

[75] Inventors: Edward P. Szuszczewicz, Laurel; Julian C. Holmes, Oxon Hill, both of Md.

[73] Assignee: The United States of America as represented by the Secretary of the Navy, Washington, D.C.

[22] Filed: Jan. 30, 1976

[21] Appl. No.: 653,880

[52] U.S. Cl. .................. 324/33; 250/526; 324/72

[51] Int. Cl.$^2$ .................. G01J 1/00; G01N 27/00

[58] Field of Search .................. 250/336, 309, 526; 324/33, 72

[56] References Cited

UNITED STATES PATENTS

| | | | |
|---|---|---|---|
| 2,996,664 | 8/1961 | Vogel et al. | 324/72 |
| 3,432,659 | 3/1969 | Elton | 250/336 |
| 3,614,606 | 10/1971 | Schmidt | 324/33 |
| 3,767,929 | 10/1973 | Shohet et al. | 250/526 |

*Primary Examiner*—Alfred E. Smith
*Assistant Examiner*—T. N. Grigsby
*Attorney, Agent, or Firm*—R. S. Sciascia; Philip Schneider; William C. Daubenspeck

[57] ABSTRACT

Method and apparatus for Langmuir probe plasma diagnostics employing an electronically controlled, discontinuous, modulated sweep of pulses in which the pulse amplitude follows a sawtooth envelope. The pulse organization procedure is such that the probe rests at a baseline potential for a period which is much longer than the pulse width and current-voltage data points are generated by each pulse. The distortions that can result when probe surface conditions change within the measurement period are eliminated by maintaining a single probe surface condition throughout the collection period of the current-voltage characteristic.

12 Claims, 12 Drawing Figures

| PULSE NUMBER | $Q_1$ | $\overline{Q}_1$ | $Q_2$ | $\overline{Q}_2$ | $Q_3$ | $\overline{Q}_3$ |
|---|---|---|---|---|---|---|
| 1 | 0 | 1 | 0 | 1 | 0 | 1 |
| 2 | 1 | 0 | 0 | 1 | 0 | 1 |
| 3 | 0 | 1 | 1 | 0 | 0 | 1 |
| 4 | 1 | 0 | 1 | 0 | 0 | 1 |
| 5 | 0 | 1 | 0 | 1 | 1 | 0 |

TRUTH TABLE FOR COUNT-OF-FIVE LOGIC

PULSED PLASMA PROBE

BACKGROUND OF THE INVENTION

This invention relates generally to plasma investigation and more particularly to modulation of Langmuir probe plasma diagnostic devices.

The Langmuir probe is an experimental device for the determination of plasma densities and energy distribution functions which has intrinsic diagnostic capabilities that are readily applied to laboratory and ionospheric plasma investigations. In its simplest form, the probe is a metallic electrode of cylindrical, planar, or spherical geometry, which collects current from a plasma when a voltage is applied. The probe's current collection properties, specifically referred to as the probe's current-voltage (I–V) characteristic, yield the basic information on the plasma under investigation. If this current-voltage characteristic is distorted by some perturbing mechanism, the accuracy of the technique can be seriously compromised.

In the coventional approach to Langmuir probe operation, the probe is driven by a continuous voltage sweep such as a linear sawtooth voltage. There is considerable evidence that this standard continuous sweep approach to Langmuir probe diagnostics can lead to serious distortions of the current-voltage characteristic measured in contaminating plasma environments. These distortions can manifest themselves as hysteresis in the current-voltage characteristic. Numerous investigators attribute this behavior to the layering of foreign material on the surface of the probe which results in variations of the effective work function of the probe. If these variations occur during the measurement interval, the current-voltage characteristic is distorted, resulting in erroneous determinations of charged-particle densities and energy distribution functions.

There are two conventional approached to eliminate or circumvent the problem of surface contamination on Langmuir probes. One approach is to periodically clean the probe surface by ion bombardment or by heating the probe. The second approach allows the existence of a contaminating layer and attempts to circumvent the associated difficulties by sweeping the probe voltage at rates which significantly exceed the time within which the probe work function can change. This approach is to reduce the period of the sweep voltage to a value shorter than the time constant associated with the surface contamination.

The periodic probe cleaning procedure is of limited use because new contamination layers can develop immediately after the cleaning process is ended. In the presence of high sorption rates another cleanup may be necessary within seconds of the preceding cleanup termination. The use of a short period for the sweep voltage finds its basic limitations in values of the effective time constant of the surface contamination layer, which can impose unworkably high sweep rates on the probe voltage. High sweep rates can often be handled in laboratory experiments but difficulties arise in rocket or satellite applications where data rate constraints are imposed by telemetry. At high sweep speeds and low telemetry rates, resolution of the current-voltage characteristic is lowered and the accuracy of measurement is reduced.

SUMMARY OF THE INVENTION

Accordingly, the present invention provides improved reliability and versatility in Langmuir probe measurements in plasmas by reducing the time variance of electrode surface conditions. A pulsed-voltage procedure is employed to maintain a single-probe surface condition throughout the collection period of the current-voltage characteristic. The probe voltage is an electronically controlled, discontinuous, modulated sweep of pulses in which the pulse amplitude follows a sawtooth envelope. Specifically, the electronic format presents consecutive sequences of four pulses which generate distinct I–V data points for the probe's current-voltage characteristic. The fifth pulse is blanked out so that current, collected at a fixed baseline voltage during the interpulse periods, can be monitored and used as a measure of possible variations in the probe-plasma system. The duration of a sweep pulse, as well as its repetition rate, can be varied over wide limits. The sweep time, sweep amplitude, interpulse time, and baseline voltage can also be tailored to fit a given experiment or can be adjusted independently during an investigation. The probe current is always sampled during a subinterval within a sweep pulse, with the subinterval position and duration being separately adjustable. This current sampling also occurs in identical fashion during the period corresponding to the blanked-out fifth pulse.

It is, therefore, an object of the present invention to provide for accurate measurements of plasma density and energy distribution parameters in a contaminated probe-plasma system.

Another object of the present invention is to provide a method for plasma investigation that allows the Langmuir probe surface to come into equilibrium with a contaminating environment and maintains the equilibrium condition of the surface layering and surface charge throughout the measurement period.

A further object of the present invention is to provide hysteresis-free Langmuir probe plasma diagnostics.

Another object of the present invention is to provide Langmuir probe operation that does not require heating or ionbombardment support circuitry to reduce the effects of surface contamination.

Yet another object of the present invention is to provide Langmuir probe operation which is reliable over a large range of surface conditions.

A further object of the present invention is to provide Langmuir probe operation which is reliable over a large range of sweep frequencies.

Still another object of the present invention is to provide a device which permits evaluation of charging effects on contaminated surfaces in probe-plasma systems.

A still further object of the present invention is to provide for study of plasma response to pulsed electric fields.

Another object of the present invention is to provide for standard retarding-field analysis of electron energy even under conditions of fluctuating plasma densities.

Another object of the present invention is to minimize the effects of charge depletion and the associated perturbation of ambient equilibrium conditions during Langmuir probe diagnostics.

Other objects and many of the attendant advantages will be readily appreciated as the subject invention becomes better understood by reference to the following detailed description, when considered in conjunction with the accompanying drawings.

BRIEF DESCRIPTION OF THE DRAWINGS

FIG. 4 illustrates the sweep generator;

FIG. 5 illustrates multivibrator and logic circuitry;

FIG. 6 illustrates the sweep modulator;

FIG. 7 illustrates the electrometers, differential amplifier, rectifier, and polarity monitor circuitry;

FIG. 8 illustrates the scale changer and gain circuitry selector;

FIGS. 9 and 10 illustrate electrometer switch logic;

FIG. 11 illustrates the monitor circuitry; and

DESCRIPTION OF THE PREFERRED EMBODIMENT

Figure 12:
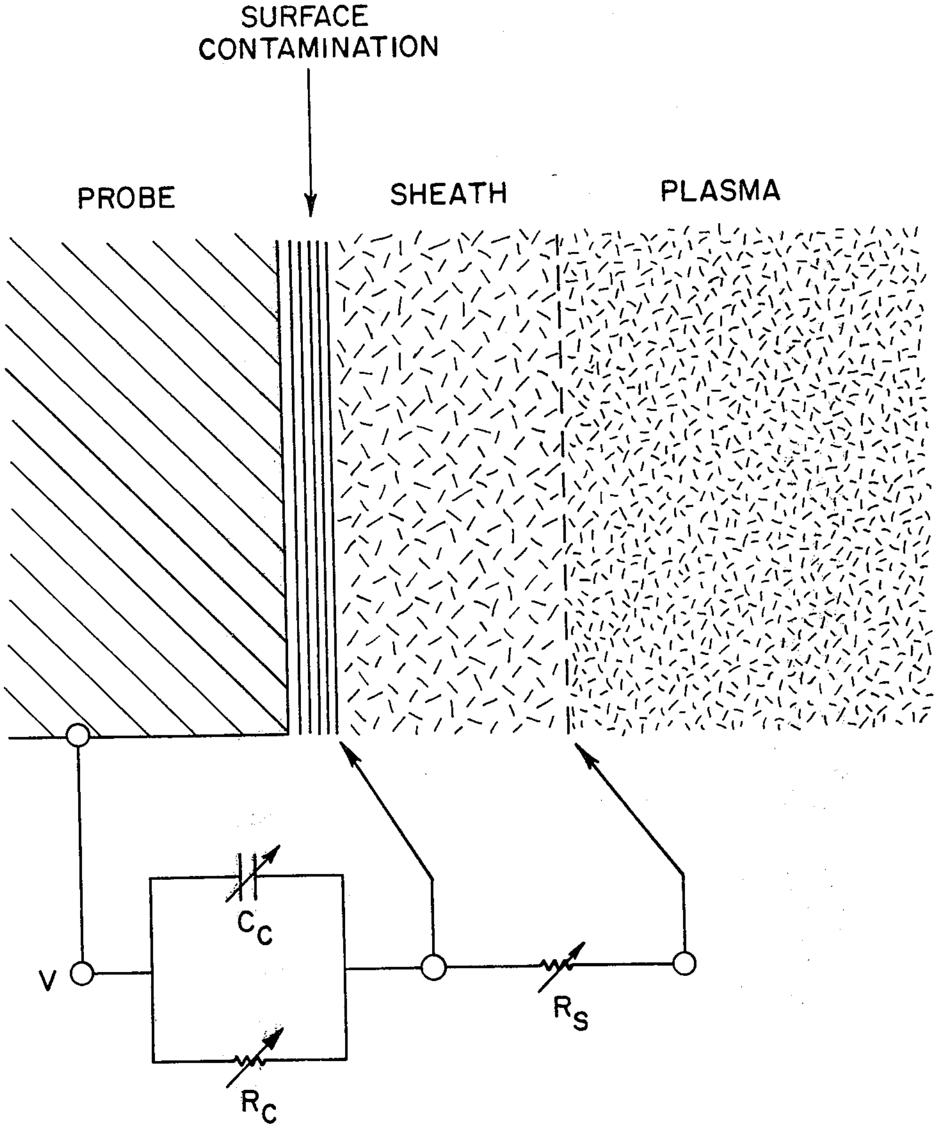
FIG. 12 is a model of the surface layering phenomenon.

Referring now to the drawings, wherein like reference characters designate like or corresponding parts throughout the several views and, more particularly to FIG. 12, there is illustrated a model for the surface layering phenomenon which schematically depicts a contaminated probe immersed in a plasma. The mechanisms for the development of the surface layer of contamination are not always easily identified but contributions may come from the deposition of sputtered material from other solids in the system or from the sorption of gases and vapors in the plasma itself. For example, a perfectly cleaned and outgassed probe when immersed in an unionized gas medium immediately begins to absorb and occlude the ambient neutral species. If these species are nonconductive, an insulating layer will develop. This layer is phenomenologically represented by capacitance $C_c$ and leakage resistance $R_c$ in FIG. 12. When a plasma is part of the environment and a voltage V is applied to the probe, charged particles will flow to the probe's contaminated surface, charge up the associated capacitance $C_c$, and simultaneously alter the absorbate surface layer by bombardment. The layering of foreign material on the surface of the probe results in a variation of the probe's work function.

These variations in the probe's surface condition and their dependence upon the applied probe voltage can manifest themselves by hysteresis in the I–V characteristic when the probe is driven with a symmetric sawtooth voltage. If the I–V characteristic is not identically reproduced in the positively and negatively sloped portions of the applied sawtooth voltage, the familiar hysteresis curve results. It is possible to sweep the probe voltage so slowly that the (I–V) data points come to identical equilibrium values in the positively and negatively sloped portions of the applied sawtooth voltage so that the measurements are in error but the investigator does not have the advantage of telltale hysteresis.

When surface contamination is a problem, conventional Langmuir probes have indicated "hotter" electron distributions than actually present in the ambient medium and hotter distributions than those measured by a "clean" probe. The charging of capacitance $C_c$ associated with the contamination layer can also result in an unknown offset voltage $V_c$ across the layer, contributing to uncertainties in determining the actual voltage imposed on a plasma by fixed-potential electrodes. These problem areas impose genuine constraints upon experimenters and make it necessary to eliminate the contaminating species from the system or circumvent the distortions in measurement by some modification in the experimental technique. Since the former approach is not always feasible, it is incumbent upon the experimenter to utilize a technique which minimizes the distortion produced by surface contamination.

To eliminate the aforementioned problems and to improve the reliability and versatility of Langmuir probe measurements, the present invention employs a pulsed-voltage procedure which maintains a single probe surface condition throughout the collection period of the I–V characteristic. This procedure allows the existence of a contamination layer but keeps the layer and its associated potential drop at a constant level.

Figure 1:
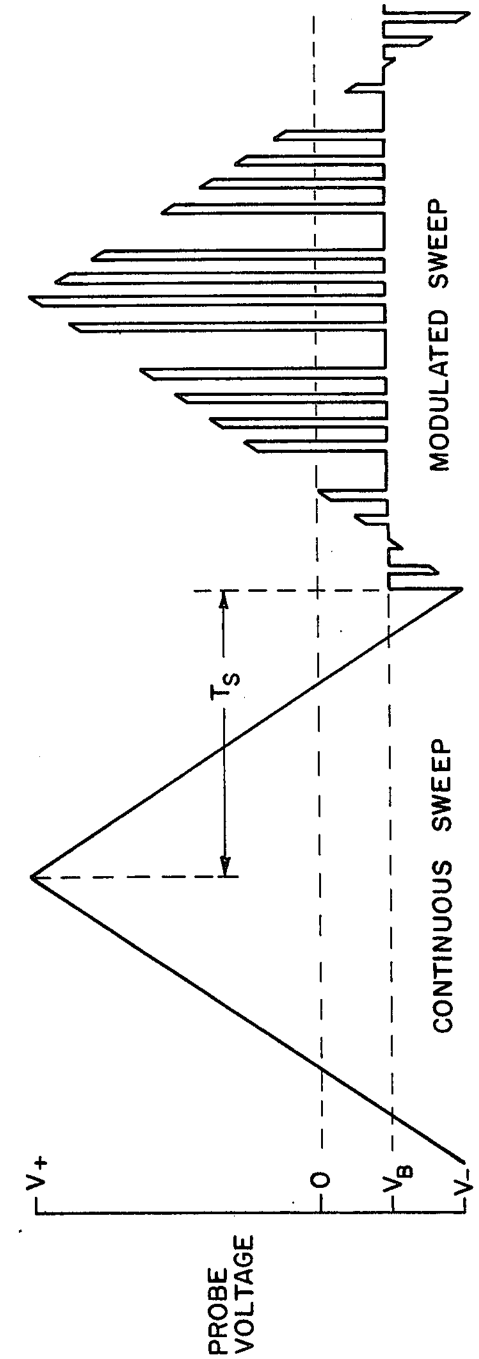
FIG. 1 illustrates continuous and modulated probe voltage waveshapes.
Figure 2:
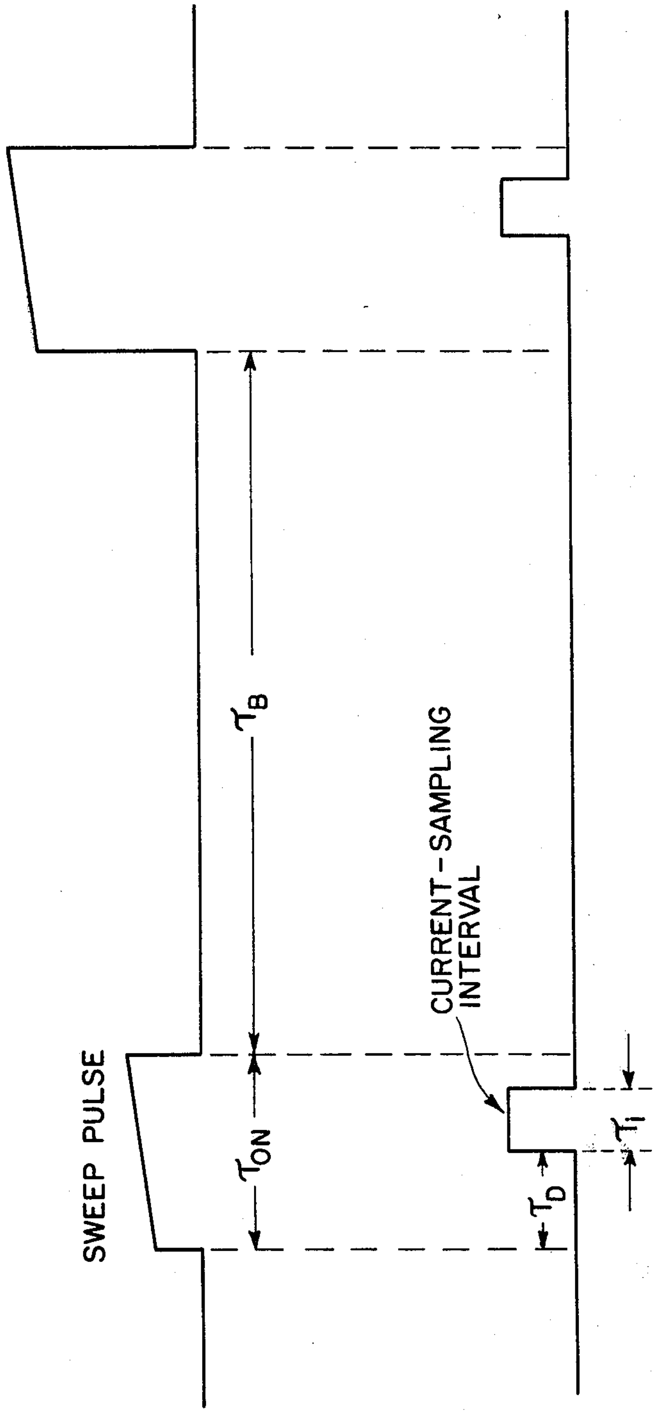
FIG. 2 illustrates the pulse modulated sweep in expanded time scale.

Referring now to FIG. 1, the continuous symmetric-sawtooth sweep voltage represents the conventional approach to Langmuir probe operation while the modulated sweep represents the technique of the present invention. The pulsed plasma probe technique employs a discontinuous modulated sweep of pulses following a sawtooth envelope. The configuration of the wave is such that the probe rests at its baseline potential $V_B$ for a period which is much longer than the pulse width. FIG. 2 is an expanded time scale of the pulse-modulated sweep showing two successive pulses with pulse and baseline durations identified as $\tau_{ON}$ and $\tau_B$, respectively. It can be seen that the probe current is always sampled during a subinterval within a sweep pulse, with the subinterval position $\tau_D$ and sampling duration $\tau_i$ adjusted so that the plasma may achieve a steady-state condition. Thus circuit transients which may cause distortions in the current signal are eliminated.

In accordance with the pulse-modulation technique, the sweep time $\tau_S$ can be as long as the individual experimenter wishes since the I–V characteristic is generated by point data collected within short pulsed-voltage periods $\tau_{ON}$. The elimination of surface effects by the pulse-modulation technique requires $\tau_{ON}$ much less than $\tau_C$, the time constant of the surface contamination layer, whereas the high frequency approach requires $\tau_S$ much less than $\tau_C$. Since $\tau_{ON}$ is always much less than $\tau_S$, the present invention greatly extends the range over which the time constant effects of the surface contamination can be neglected. $\tau_{ON}$ can be as short as the time required for the plasma to establish itself at a steady-state condition during the pulse period.

Any variation of $\tau_S$, $\tau_{ON}$, and $\tau_B$ can be utilized as long as the relative times are held to the constraint of $\tau_{ON} << \tau_B < \tau_S$. The greater the inequality $\tau_B < \tau_S$, the greater is the number of data points collected on the I–V characteristic.

Of course, it is not necessary that the voltage pulses follow a sawtooth envelope. The envelope can be any form which allows a total voltage excursion from $V_-$ to $V_+$.

Referring again to FIG. 1, a preferred embodiment of the pulse-modulated sweep is shown. The modulated sweep comprises consecutive sequences of four pulses which generate distinct I–V data points for the probe's current-voltage characteristic. The fifth pulse is blanked out so that current collected at the fixed baseline voltage during the interpulse periods can be monitored and used as a measure of possible variations in the probe-plasma system.

Figure 3:
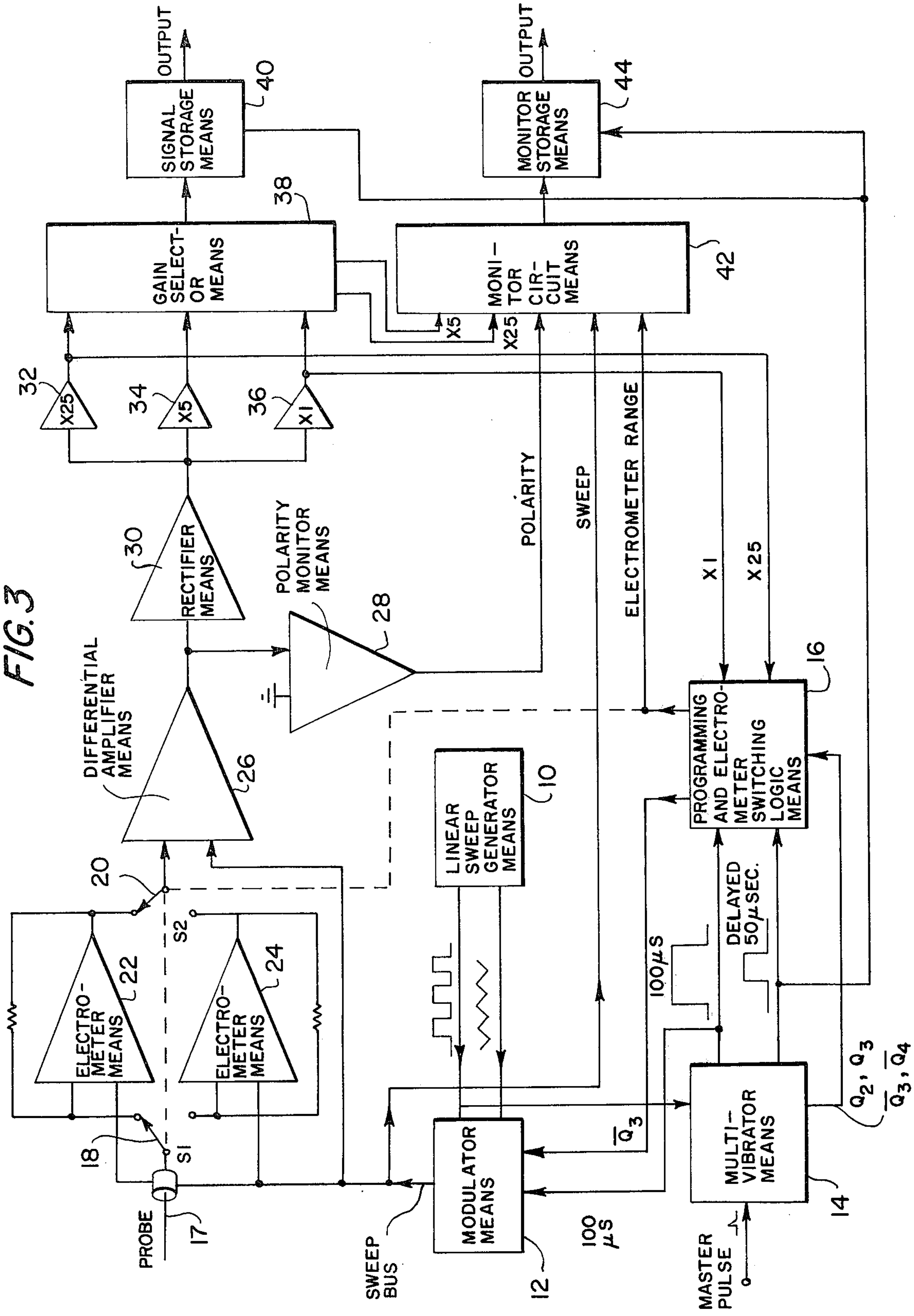
FIG. 3 illustrates a block diagram of the pulsed plasma probe.

Referring now to FIG. 3 which illustrates a preferred embodiment of the pulsed plasma probe in block diagram form, the output of linear sweep generator means 10 is coupled to modulator means 12. The pulsed probe voltage sweep is produced when the sweep generator means 10 is interrupted sequentially by modulator means 12. Multivibrator means 14 is coupled to modulator means 12 and provides a sweep modulation pulse which triggers the modulator means to interrupt the output of linear sweep generator means 10. Multivibrator means 14 also provides a pulse, synchronized with the sweep pulse, to logic means 16 which establishes the sampling interval during which the probe current is measured and stored. Logic means 16 programs this embodiment to alternate between a pulse-modulated sweep mode and a continuous sweep mode, with probe-current sampling in either mode occurring during the current-sampling interval only. The modulator pulse and probe-current sampling repetition rates are equal to that of an externally generated master pulse which is supplied to multivibrator means 14.

The output of modulator means 12, the voltage sweep, is applied to probe 17. Electrometer means 22, 24 and differential amplifier means 26 are also coupled to the output of modulator means 12. Logic means 16, connects probe 17, to either high sensitivity electrometer 22 or low sensitivity electrometer 24, depending on the magnitude of the probe current. Electronic switch 20 connects the output of the electrometer 22 or 24 which is in use to differential amplifier means 26. Differential amplifier means 26 converts the floating electrometer output voltage to a ground-referenced voltage signal, the polarity of which is monitored in polarity monitor means 28. The signal itself is then full-wave rectified in rectifier 30 so that positive and negative current signals appear with positive polarity. This obviates mirror image circuits to process bipolar signals.

The rectified signal is then sent to three parallel amplifiers 32, 34, and 36 having gains of 25, 5, and 1 respectively. Gain selector 38 sends to signal storage means 40 the output signal from the highest gain amplifier 32, 34, and 36 that is not in signal saturation. Signal storage means 40 holds the signal value until the next probe-current sample arrives.

The outputs of X1 amplifier 36 and X25 amplifier 32 are coupled to logic means 16. Through appropriate logic circuits in logic means 16, a signal that exceeds the range of the X1 amplifier 36 switches the probe from the high sensitivity electrometer 22 to the low sensitivity electrometer 24. If the X25 amplifier signal falls below a certain fixed value, the higher sensitivity electrometer 22 is restored to operation. With the electrometer and amplifier gain ratios set at 100/1 and 25/1 respectively, Langmuir-probe input currents with an amplitude range of 2500 arrive at the output with comparable amplitudes. Different dynamic ranges can be selected simply by changing the gains of electrometers 22, 24 and amplifiers 32, 34, and 36.

One feature of the electrometer-selection logic is that electrometer switching never occurs while probe current is actually being measured. If for instance, a probe-current sample saturates the X1 (least sensitive) amplifier 36, then the less sensitive electrometer 24 is switched into the circuit immediately following the sweep pulse so that switching transients will have settled down by the time the next sweep pulse arrives. Because the value of the probe-current measured during a sweep pulse is most often quite different from that measured during a blanked-out pulse (when the baseline voltage is applied, see FIG. 1), logic means 16 is programmed to separate the required electrometer switching information for pulses 1, 2, 3, and 4 from that for the "missing" pulse 5. Thus prior to the occurrence of a probe-current measurement at the baseline voltage $V_B$ (pulse 5), logic means 16 has already selected the electrometer specified by the value of the probe-current measured during the previous pulse 5. Likewise, prior to the occurrence of pulses 1, 2, 3, or 4, electrometer switching will have been governed by the probe-current measured during pulses 4, 1, 2, or 3 respectively.

For each measurement of probe-current, the selected values of amplifier gain, electrometer sensitivity, signal polarity, and sweep voltage must be known in order for the I–V characteristic to be obtained. These functions are monitored in Monitor Circuit means 42 and stored in Monitor Storage means 44 for that purpose.

Figure 4:
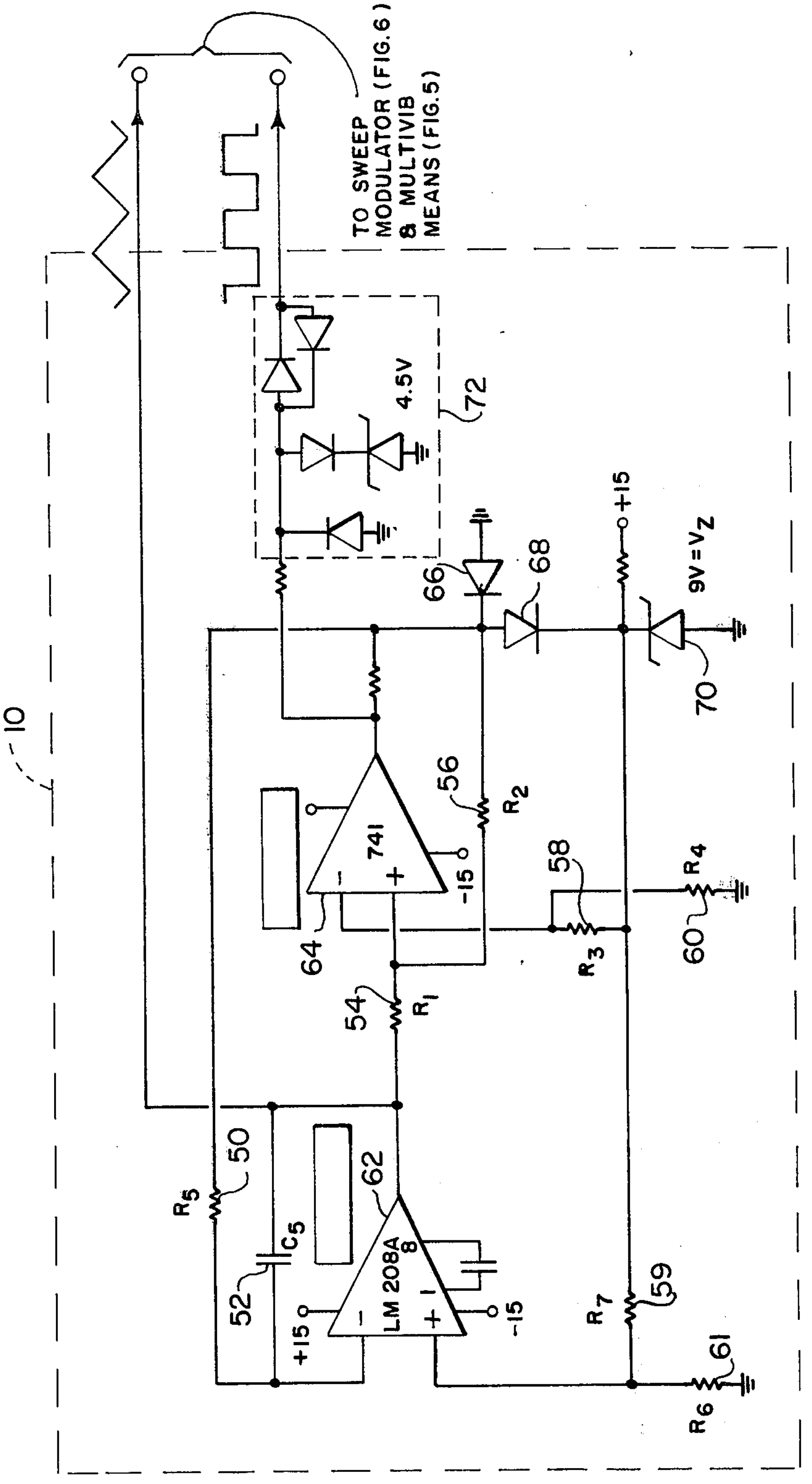
FIGS. 4–11 are electrical schematic drawings of portions of the pulsed plasma probe, and in particular.

Referring now to FIGS. 4–11 which illustrate electronics to practice the preferred embodiment of the pulsed plasma probe and, in particular to FIG. 4, the circuit there shown produces a linear sweep voltage as illustrated in FIG. 1 at a sweep rate inversely proportional to the product $R_5C_5 \approx \tau_S$ (resistor 50 and capacitor 52), with voltage limits $V_-$ and $V_+$ determined by voltage $V_Z$ of zener diode 70 and resistors $R_1$, $R_2$, $R_3$, and $R_4$ (54, 56, 58, and 60). Operational amplifier 62, a linear integrator, determines the sweep rate; amplifier 64 reverses the sweep direction at voltage limits $V_-$ and $V_+$. The output excursion of amplifier 64 is limited by diodes 66 and 68 to slightly more than $V_Z$. With $V_Z$ fixed, the ratio $R_1/R_2$ determines the peak-to-peak sweep-voltage excursion, and the ratio $R_3/R_4$ sets the voltage about which the excursion is centered. If $R_6$ and $R_7$ (resistors 59 and 61) are equal, the slopes of the positive-going and negative-going sweeps are equal in absolute value. The square-wave output from amplifier 64 is rendered TTL compatible by diode network 72 which limits the square-wave to between 0 and 5V.

Figure 5:
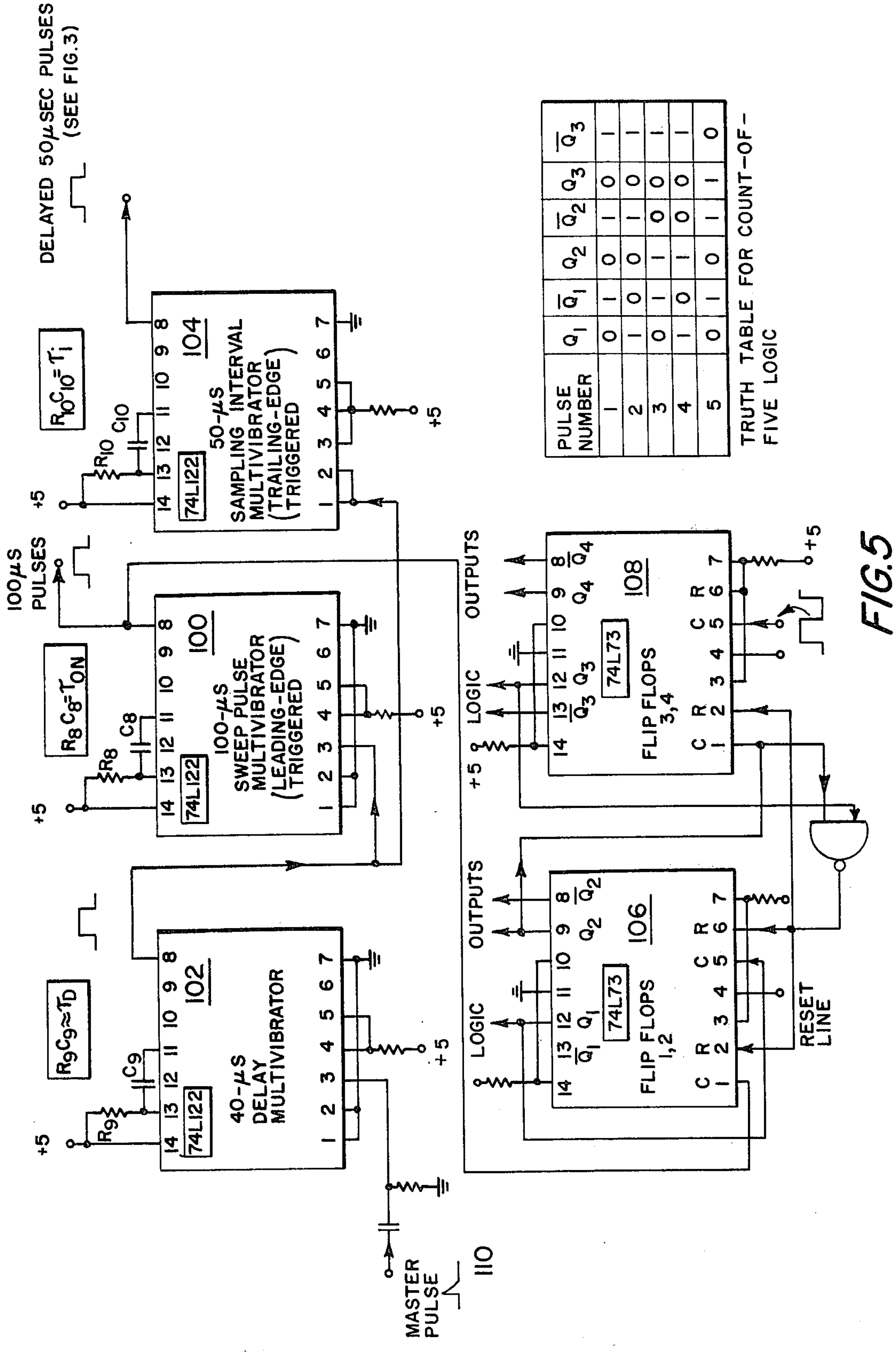

Referring now to FIG. 5, an externally generated master pulse 110 determines the probe-current sampling rate for the instrument and triggers the pulse sequence of FIG. 2. Multivibrator 100 produces the sweep modulation pulse, the length of which is determined by $R_8C_8 \approx \tau_{ON}$ and is set to 100 $\mu$s in this embodiment. A second multivibrator 102 determines the time delay between initiation of the sweep pulse and the beginning of the probe-current sampling interval; this delay is determined by $R_9C_9 \approx \tau_D$ and is set to 40 $\mu$s. A third multivibrator 104 generates the probe-current sampling interval, which is controlled by $R_{10}C_{10} \approx \tau_i$ and is set in this case to 50 $\mu$s. This current-sampling pulse, which enables signal storage means 40 and monitor storage means 44, terminates 10 $\mu$s before the end of the 100 $\mu$s sweep pulse and thus avoids the signal and monitor transients that accompany the termination of the sweep pulse itself.

Figure 6:
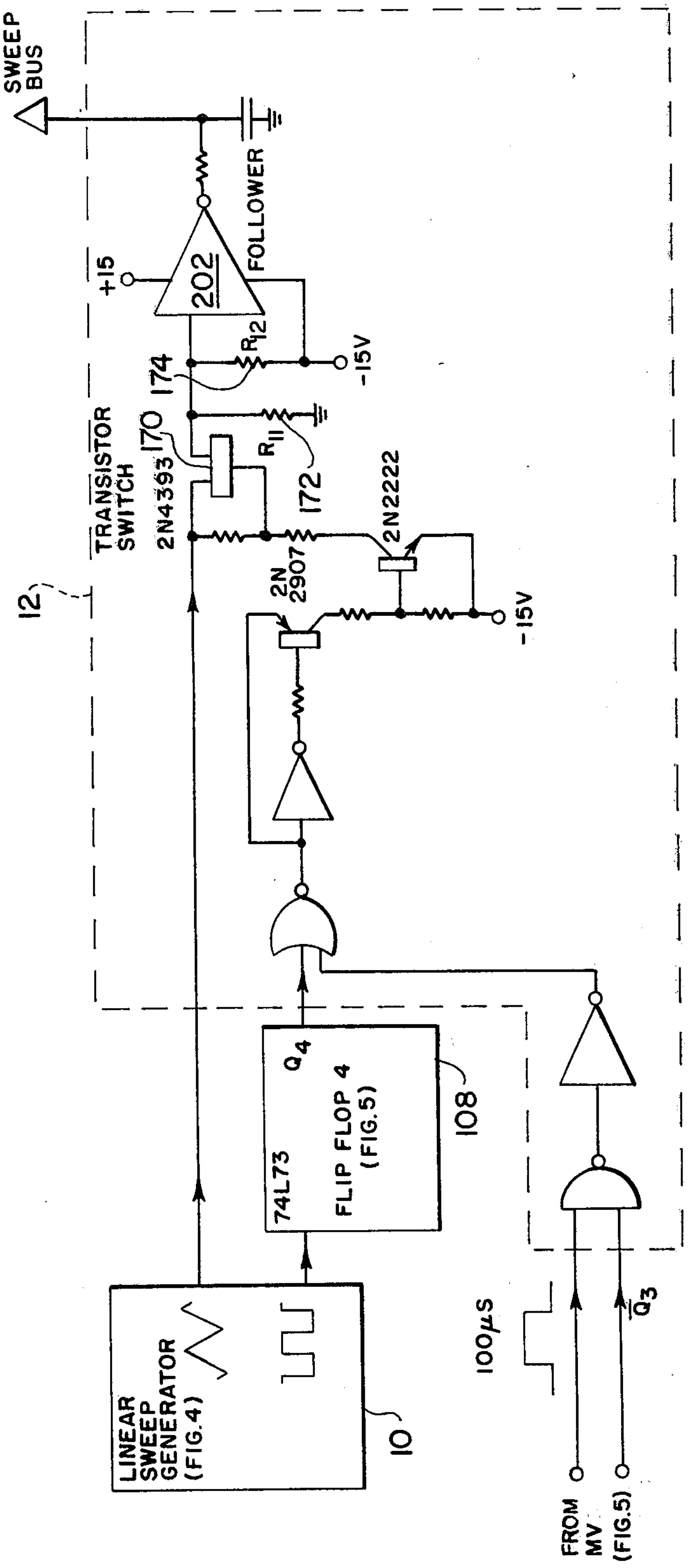

FIG. 6 details the sweep modulator 12 and shows transistor switch 170, which in an opened state maintains a fixed voltage $V_B$ on the sweep bus. This fixed-voltage level is established by the $R_{11}/R_{12}$ divider network. Modulation of the sweep is accomplished by closing the switch 170 and connecting the sawtooth voltage to the sweep bus only during a 100 μs sweep pulse. In this particular instrument a pulse-modulated sweep alternates with a conventional linear (unmodulated) sweep. Flip-flop 4 (also shown in FIG. 5 as comprising one-half of flip-flop circuit 108) disables the modulator 10 on alternate cycles of the linear-sweep generator. During modulation, the 100 μs sweep pulses close transistor switch 170, leaving it open during the interpulse interval. Pulse 5 is blanked-out by the logic input from $\overline{Q}_3$. During alternate sweeps, the transistor switch 170 is closed, and the continuous linear sweep is sent unaltered to the sweep bus. During the continuous sweep, the multivibrator pulse sequence continues uninterrupted, and the probe-current is sampled during the sampling interval only, just as it is in the pulsed-sweep mode.

Figure 7:
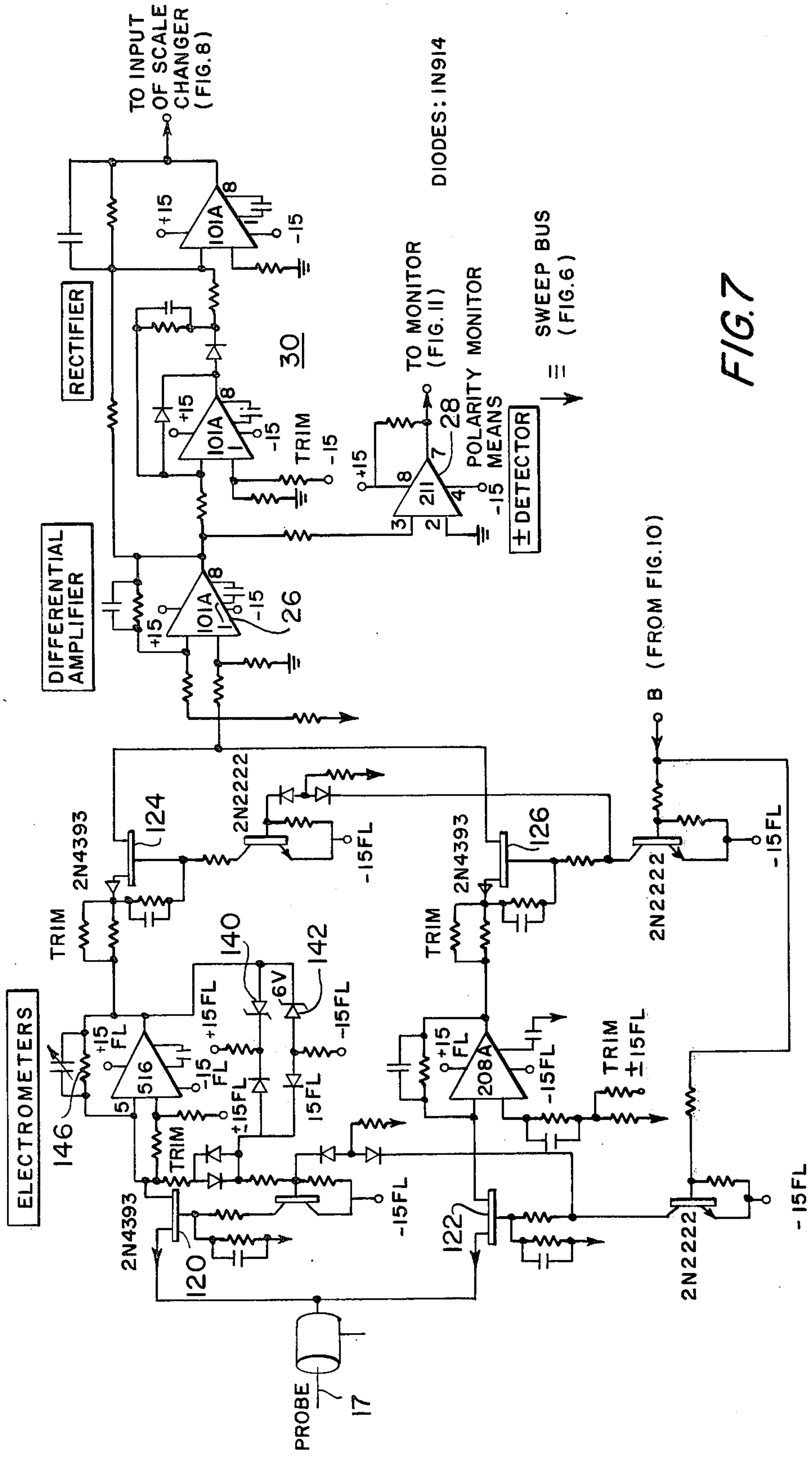

Referring now to FIG. 7, high sensitivity electrometer 22 and low sensitivity electrometer 24 are connected and disconnected by transistor switches 120, 122 in the input leads and transistor switches 124, 126 in the output leads. A positive voltage on line B connects high sensitivity electrometer 22 into the circuit.

A high speed operational amplifier is used for high sensitivity electrometer 22. Zener diode limiters 140, 142 shunt the feedback impedance 146 during large instantaneous capacitive input currents caused by the leading edge of the sweep pulse. Without limiters, recovery from such transients may be too slow; recovery in the less sensitive electrometer 24 is sufficiently fast that limiters are not necessary.

The electrometer output signal and the sweep voltage are sent to the differential amplifier 26 for sweep-voltage subtraction. The resulting signal voltage is referenced to ground and proceeds to polarity monitor 28 for detection of changes in signal polarity and to an analog full-wave rectifier 30 which transmits incoming positive signals and inverts those of negative polarity. The full-wave rectified signal is sent to the scale changer.

Figure 8:
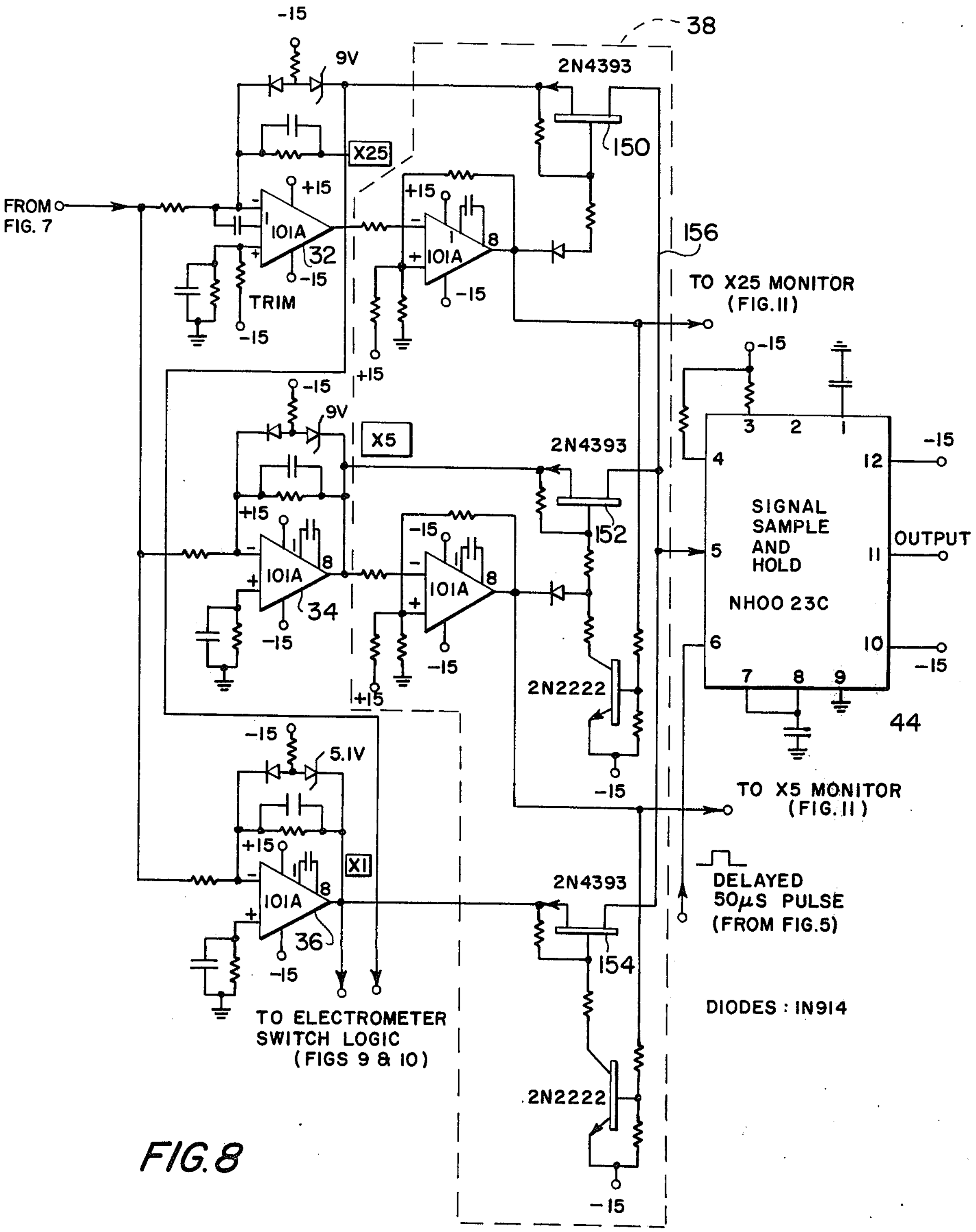

Referring now to FIG. 8, three separate amplifiers 32, 34, and 36 having gains of 25, 5, and 1 respectively, have a common input terminal and provide a convenient dynamic range to bridge and extend the 100-to-1 sensitivity difference between the electrometers 22,24. Transistor switches 150, 152, and 154 in each amplifier output connect the most sensitive amplifier having an on-range signal to a common input line 156, which is the input to signal monitor means 40. During each 50 μs current-sampling pulse, the voltage on the signal monitor means input 40 is stored and held. The particular amplifier in use at this time is identified by monitor voltages sent to the monitor circuit means 42.

Figure 9:
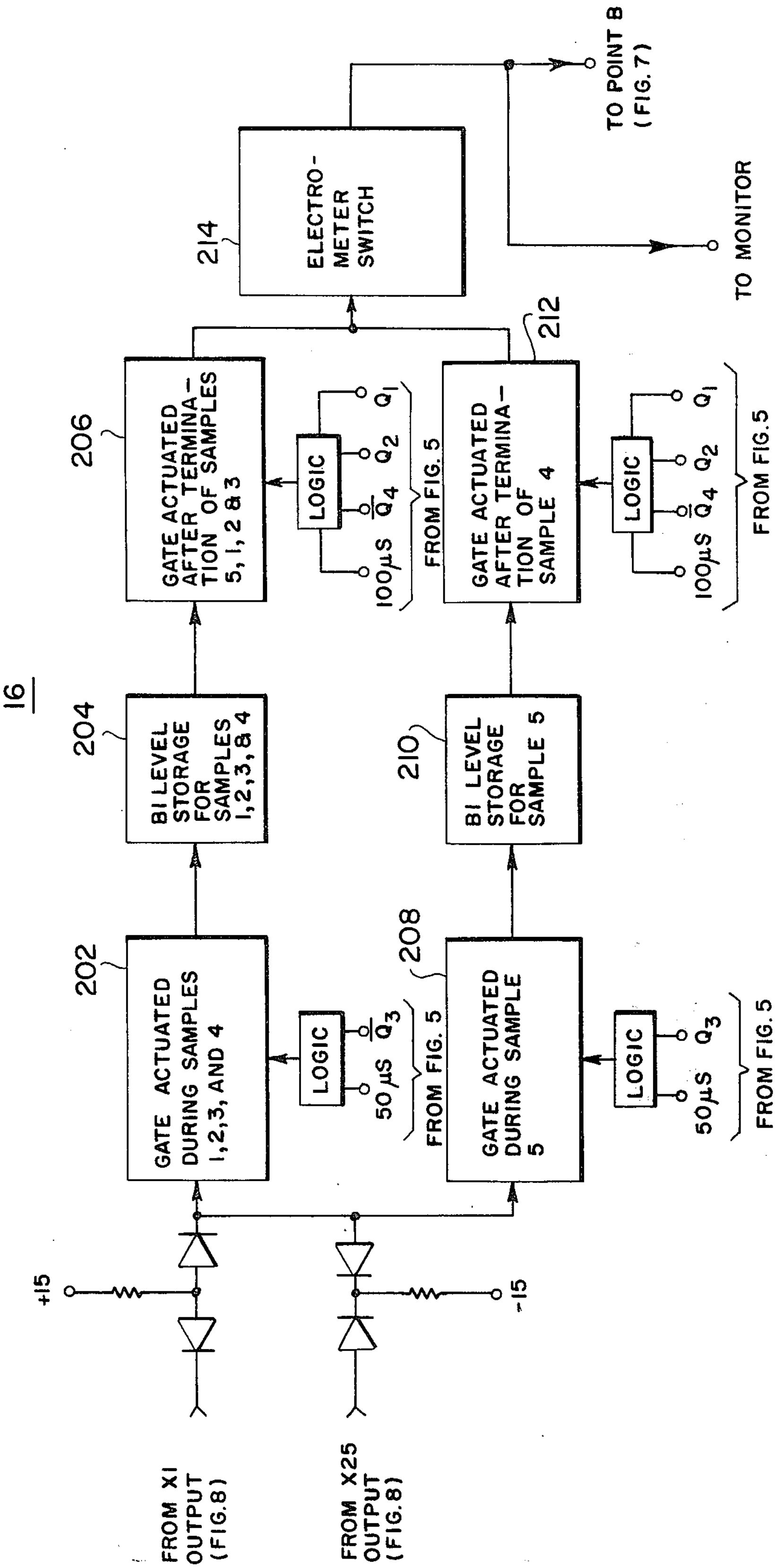
Figure 10:
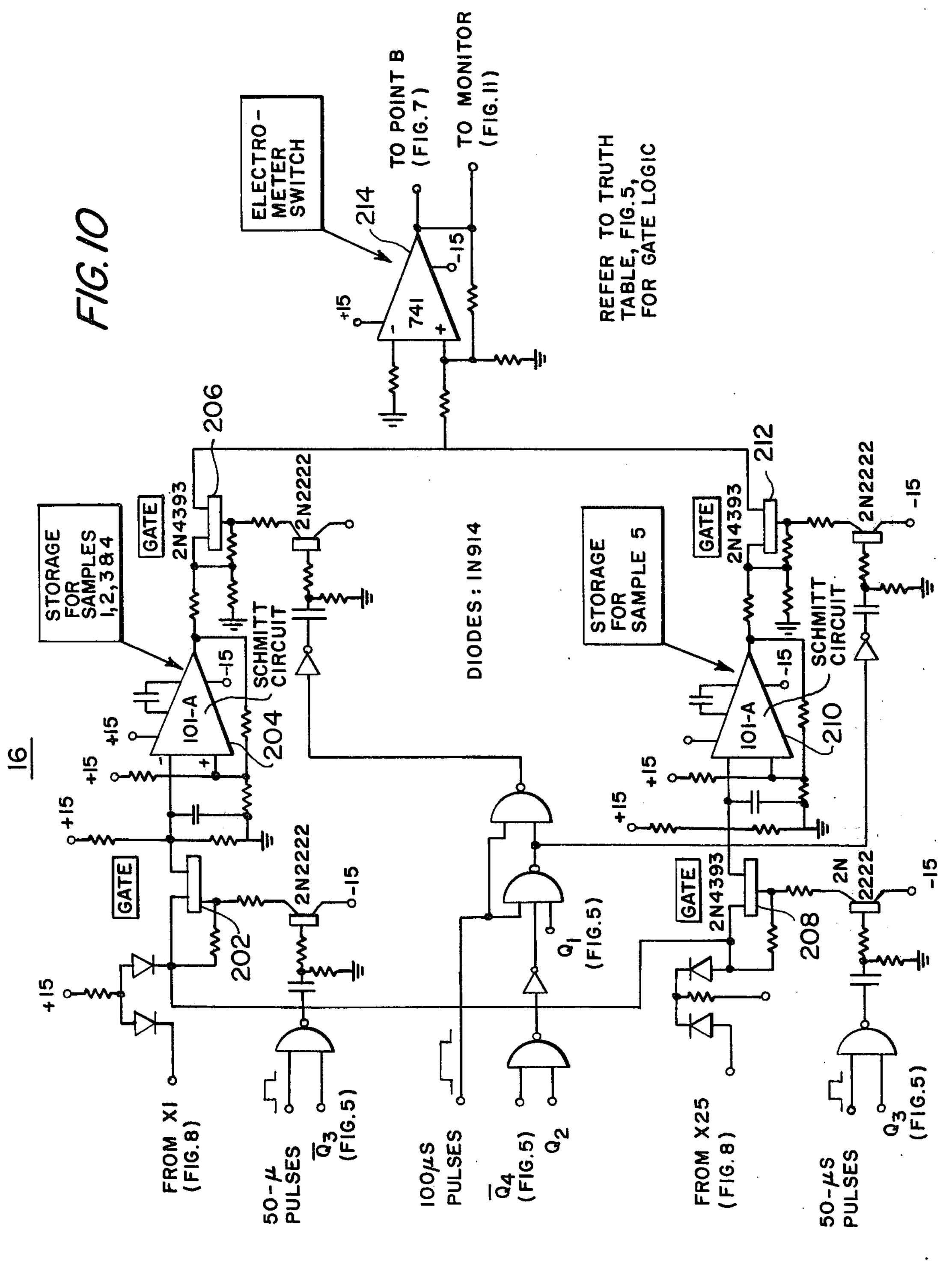

Referring now to FIGS. 9 and 10, this circuit decides which electrometer shall be used for the next sample pulse on the basis of the signal level measured during the previous sampling pulse. If the signal from the X1 amplifier 36 is greater than 4.9 V (of a maximum range of 5.0 V), then the low-sensitivity electrometer 24 will be used for the next try. If, on the other hand, the signal from the ×25 amplifier 32 is less than 1.0 V, then the more sensitive electrometer 22 will be tried next.

Electrometer switching takes place on the trailing edge of the sweep pulse, a few microseconds after the signal sample has been taken. This allows time for the new electrometer to settle down before the next sampling pulse arrives. As was discussed heretofore, storage of electrometer-switching information for the blanked-out pulse 5 is separate from storage for pulses 1, 2, 3, and 4.

The signal-level switching information from the X25 and X1 amplifiers is held in bilevel Schmitt storage circuits 204, 210 which, at the termination of the sweep pulse, flip the electrometer switch 214 (also a Schmitt circuit) to the state identical to that of the storage circuit. Storage for pulses 1, 2, 3, and 4 is Schmitt circuit 204, and storage for pulse 5 is Schmitt circuit 210.

It should be noted that the storage-circuit input gates 202, 208 conduct during the sampling pulse, whereas the storage-circuit output gates 212, 206 conduct during the differentiated trailing edge of the sweep pulse. Logic for these gates originates at the count-of-five outputs which are labeled in FIG. 10.

Figure 11:
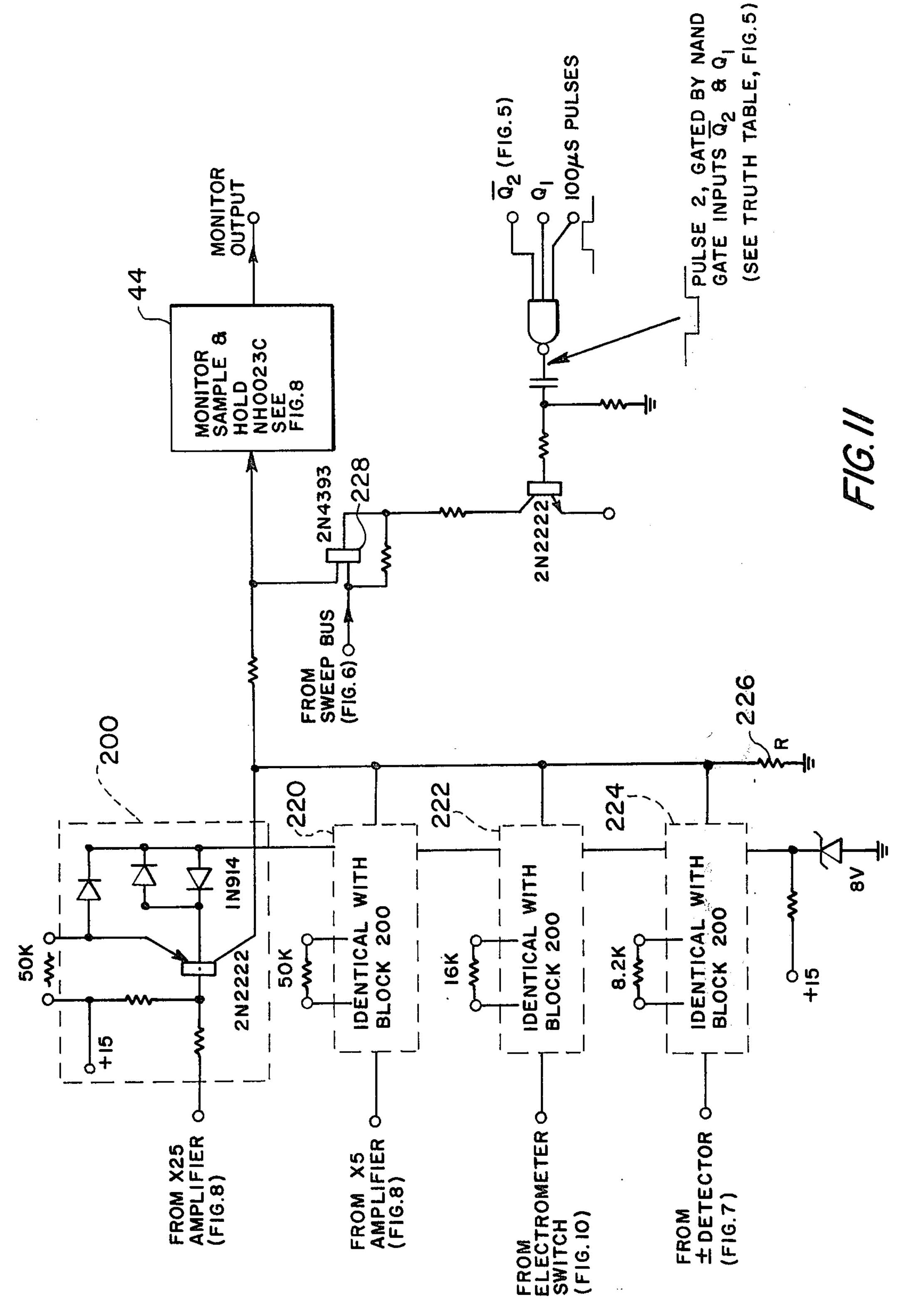

Referring now to FIG. 11, four constant current generators 200, 220, 222, and 224 receive inputs from ×25 amplifier 32, ×5 amplifier 34, electrometer switch 214 and comparator 28, respectively. Each monitored function turns "on" and "off" its own constant-current generator 200, 220, 222, and 224, which feed a common resistor 226. The voltage across resistor 226 is sampled and stored during each sampling pulse. For appropriately chosen values of constant current, each combination of possible states of these four functions produces its own unique voltage across R. During the occurrence of each pulse 2 (of the count of five), switch 228 connects the sweep voltage to the monitor circuit means 42 so that of each five monitor samples, one of them is equal to the instantaneous value of the sweep voltage.

Referring now to power supply requirements for the electronics illustrated in FIGS. 4–11, the operational amplifiers require 15V positive and negative supplies. A positive 5V supply is required by the TTL logic of multivibrators 100, 102, 104 and flip-flop circuits 106, 108 Because electrometers 22, 24 are referenced to the sweep voltage rather than to ground, it is necessary that the power supplies for the electrometers be separate from those that serve the rest of the instrument and that they have high capacitive reactance to ground. The common terminal of the positive and negative 15V electrometer supplies is connected to the sweep voltage rather than to ground.

Referring again to FIGS. 4–11, and in particular to the specific manufacturer component designations noted therein, the specific components are not critical to the practice of the invention. It will be apparent to one skilled in the art that each so designated component may be replaced by equivalent components obtainable from other sources without altering the practice of the pulsed plasma probe. However, it may be beneficial to more particularly identify those devices which have been utilized in the preferred embodiment and identified in the drawings. Accordingly, the components utilized in the preferred embodiment are more specifically identified as follows: the designations LM208A, LM101A, LM211, NH0023C, and LM202 refer to circuit components which are obtainable from National Semiconductor Corporation of Santa Clara, Calif.,; the designations 74L122 and 74L73 refer to components obtainable from Texas Instruments, Incorporated of Dallas, Texas; amplifier 741 refers to a component obtainable from Fairchild Semiconductor of Mountain View, Calif.; the designation 516 refers to a high speed operational amplifier obtainable from Analog Device, Inc. of Norwood, Mass.; and the components designated 2N4393, 2N2222, 2N2907, 1N914 may be obtained from Motorola, Inc. of Franklin Park, Ill.

From the foregoing, it can be seen that the pulsed plasma probe results in improved reliability and expanded versatility in laboratory and ionospheric plasma studies. As an improved diagnostic tool the pulsed plasma probe eliminates the errors that can result in the determinations of electron densities, energy distribution functions and ambient electric fields when probe surface conditions change within the measurement period. The probe has improved capabilities for studying time-varying phenomena, whether they be the plasmas ability to respond to pulsed and rf electric fields, or the time variation of electrode surface conditions.

The versatility of the pulsed plasma probe allows the following specific applications:

variability in $\tau_S$ of the continuous-sawtooth mode permits studies of the response of plasma sheaths at both low and high frequencies;

variability of the ratio $\tau_{ON}/\tau_B$ permits an evaluation of charging effects on contaminated surfaces, and the alternate-mode capability (continuous sawtooth followed by pulse modulation) permits direct and immediate comparison of the two approaches for collecting Langmuir-probe characteristics;

the variability in $\tau_i$ and $\tau_D$ makes possible the study of plasma response to pulsed electric fields, and measurement of the baseline current $I_B$ permits a standard retarding-field analysis of electron energy, even under conditions of fluctuating plasma densities.

Obviously, many modifications and variations of the present invention are possible in light of the above teachings. It is therefore to be understood that within the scope of the appended claims, the invention may be practiced otherwise than as described.

What is claimed and desired to be secured by letters patent of the United States is:

1. A device for plasma investigation for applying a voltage to a probe and measuring the current collected by said probe comprising:

generator means for providing a sweep voltage;

modulator means coupled to said generator means to provide a pulse-modulated voltage for application to said probe, the output of said modulator means being coupled to said probe; and measuring means coupled to said probe to measure current collected by said probe.

2. The device for plasma investigation as recited in claim 1, wherein said measuring means comprises an electrometer means.

3. The device for plasma investigation as recited in claim 2 further comprising:

a plurality of amplifiers coupled to output of said electrometer means, each amplifier having a different amount of amplification;

means for selecting output of that amplifier of said plurality of amplifiers having greatest amplification and not being in signal saturation; and means for monitoring the identity of said amplifier having greatest amplification and not being in signal saturation.

4. The device for plasma investigation as recited in claim 2 further comprising:

differential amplifier means coupled to said electrometer means, said differential amplifier means being further coupled to said modulator means for receiving the output of said modulator means, and the output of said modulator means being further coupled to said electrometer means, whereby the output of said electrometer means is referenced to output of said modulator means and said differential amplifier means subtracts said output of said modulator means from said output of said electrometer means to provide a ground referenced signal.

5. The device for plasma investigation as recited in claim 4 further comprising:

a plurality of amplifiers coupled to output of said differential amplifier means, each amplifier having a different amount of amplification;

means for selecting output of that amplifier of said plurality of amplifiers having greatest amplification and not being in signal saturation; and means for monitoring the identity of said amplifier having greatest amplification and not being in signal saturation.

6. A device for plasma investigation for applying a voltage to a probe and measuring the probe current collected by said probe comprising:

generator means for providing a sweep voltage;

modulator means coupled to said generator means to provide a pulse-modulated voltage for application to said probe, the output of said modulator means being coupled to said probe;

a plurality of electrometers having different sensitivities for measuring said probe current, said modulator output being coupled to said plurality of electrometers;

first switching means coupled between said plurality of electrometers and said probe;

differential amplifier means coupled to output of said modulator means;

second switching means coupled between said plurality of electrometers and said differential amplifier means; and logic means responsive to said probe current to actuate said first and second switching means to connect the appropriate electrometer between said probe and said differential amplifier means.

7. The device for plasma investigation as recited in claim 6 further comprising:

a plurality of amplifiers coupled to the output of said differential amplifier means, each amplifier means having a different amount of amplification;

means for selecting output of that amplifier of said plurality of amplifiers having the greatest amplification and not being in signal saturation; and means for monitoring the identity of said amplifier having greatest amplification and not being in signal saturation and the identity of the electrometer of said plurality of electrometers coupled to said probe.

8. The device for plasma investigation as recited in claim 7 further comprising:

rectifier means coupled between said differential amplifier means and said plurality of amplifier means; and polarity monitor means coupled to said differential amplifier means to determine the polarity of the output of said differential amplifier means.

9. A method for plasma investigation for use with a Langmuir probe comprising:

applying a series of voltage pulses to said probe, each pulse having a duration sufficient to allow the plasma to establish a steady-state condition but less than the period within which the probe surface conditions can change in response to said voltage pulse;

applying a constant baseline voltage to said probe during the period between said voltage pulses;

varying the amplitude of said voltage pulses so that pulses of different amplitudes will be applied to said probe; and measuring the current collected by said probe to obtain a relationship between said applied voltage and said current collected.

10. A method for plasma investigation as recited in claim 9 wherein the amplitude of said voltage pulses is varied between a voltage less than said baseline voltage and a voltage greater than said baseline voltage.

11. A method for plasma investigation as recited in claim 9 wherein measuring the current collected by said probe comprises:

applying said probe current to an electrometer for converting said probe current to a voltage proportional to said probe current, said electrometer being referenced to said voltage pulses and baseline voltage so that said proportional voltage is referenced to said voltage pulses and baseline voltage; and converting said proportional voltage to a ground referenced proportional voltage.

12. The method for plasma investigation as recited in claim 11 wherein:

the duration of said voltage pulses is much less than the duration of said baseline voltage; and the amplitude of said voltage pulses follows a sawtooth envelope.

* * * * *